(12) United States Patent
Kendall

(10) Patent No.: US 6,290,190 B1
(45) Date of Patent: *Sep. 18, 2001

(54) SUPPORT DEVICE

(75) Inventor: Gregory David Kendall, Hamilton (NZ)

(73) Assignee: Gallagher Group Limited, Hamilton (NZ)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/077,270

(22) PCT Filed: Dec. 11, 1996

(86) PCT No.: PCT/NZ96/00139

§ 371 Date: Jun. 8, 1998

§ 102(e) Date: Jun. 8, 1998

(87) PCT Pub. No.: WO97/23128

PCT Pub. Date: Jul. 3, 1997

(51) Int. Cl.$^7$ ........................................... F16L 3/08
(52) U.S. Cl. .................... 248/65; 174/158 R; 174/163 F; 256/10
(58) Field of Search ............................ 248/65, 218.4, 248/68.1, 67.7, 73, 74.1, 74.2, 304, 548, 909; 256/10, 47, 48, 52; 174/158 R, 161 F, 163 F; 340/541, 661, 533

(56) References Cited

U.S. PATENT DOCUMENTS

| | | | |
|---|---|---|---|
| 3,652,780 | * 3/1972 | Wilson | 174/45 R |
| 3,733,429 | * 5/1973 | Berg, Jr. et al. | 174/161 F |
| 3,749,820 | * 7/1973 | Langlie et al. | 174/163 F |
| 3,820,758 | * 6/1974 | Berg, Jr. et al. | 256/10 |
| 4,028,489 | * 6/1977 | Berg, Jr. et al. | 174/166 R |
| 4,049,905 | * 9/1977 | Maranell | 174/163 F |
| 4,077,611 | 3/1978 | Wilson | 256/10 |
| 4,220,949 | * 9/1980 | Pope et al. | 340/533 |
| 4,297,633 | * 10/1981 | McCutchan et al. | 324/51 |
| 4,318,088 | * 3/1982 | Hunter | 340/541 |
| 4,523,187 | * 6/1985 | Begg | 340/661 |
| 4,599,488 | * 7/1986 | Wilson, Jr. | 174/158 F |
| 4,623,756 | * 11/1986 | Wilson, Jr. | 174/158 F |
| 4,680,428 | * 7/1987 | Wilson, Jr. | 174/158 F |
| 4,866,218 | * 9/1989 | Wilson, Jr. | 174/158 F |
| 4,883,923 | * 11/1989 | Langlie et al. | 174/158 F |
| 5,096,162 | * 3/1992 | Cleveland | 256/10 |
| 5,959,255 | * 9/1999 | Langlie et al. | 174/161 F |

FOREIGN PATENT DOCUMENTS

| | | |
|---|---|---|
| 0 699 386 | 3/1996 | (EP) . |
| 2 551 909 | 3/1996 | (FR) . |

* cited by examiner

*Primary Examiner*—Leslie A. Braun
*Assistant Examiner*—Tan Le
(74) *Attorney, Agent, or Firm*—Darby & Darby

(57) ABSTRACT

A support device (1) for supporting a length of material (8) wherein the support device includes: at least one support finger (4,5) for supporting the length of material (8) which applies an initial load to the support finger (5); the support device characterised in that the support finger (5) no longer supports the length of material (8) when the support finger is placed directly or indirectly under a load substantially greater than the initial load.

7 Claims, 2 Drawing Sheets

SUPPORT DEVICE

TECHNICAL FIELD

This invention relates to a support device.

In particular this invention relates to improvements in support devices used to support lengths of material utilised in fences.

BACKGROUND ART

This invention will be discussed in relation to support devices used as insulators to support electrically conducting lengths of material, particularly in relation to security fences. However, it should be appreciated that the principles of the present invention can be applied to the support of many other non-electrically conducting lengths of material in various different situations.

Insulators have been in use for many years for supporting and insulating the wires or other conductors used in electric fences.

Existing insulators commonly have a backing surface and two support fingers for supporting the wire at attached to the backing surface. The fingers will now be referred to as upper and lower support fingers.

These fingers are positioned so that the free end of the upper support finger is directed towards the fixed end (on the backing surface) of the lower support finger. Similarly, the lower support finger is positioned so that its free end is directed towards the fixed end (on the backing surface) of the upper support finger.

The free ends of both support fingers are positioned side by side so that they may overlap. This overlap of the free ends effectively creates a gap between the two support fingers through which a wire may be passed and subsequently restrained by the fingers.

In practice it is only what may be referred to as the lower support finger which actually supports the wire. The function of the upper support finger is to prevent any movement of the wire, (for example by wind) which could lead to the wire being no longer able to be supported by the lower support finger.

As the upper and lower fingers are functionally identical there are two equivalent orientations for supporting the wire should the insulator be rotated through 180 degrees to an alternate orientation. This feature allows for easy mounting of this type of insulator to fence posts or other vertical supports. This is because the person responsible for mounting these devices need not concern themselves with which of two possible orientations the insulator is to have, as functionally the two orientations are equivalent.

However there is a problem associated with current insulators when they are used in electric security fences.

This problem arises as the current insulators have functionally equivalent support fingers which, in addition to supporting the wire are capable of supporting the extra weight of a person. Hence people are able to climb the security fence wires commonly near the pole to which the support devices are attached. Thus, allowing the intruder to breach the perimeter enclosed by the security fence without detection.

Sometimes the insulator itself and its attachment to the pole gives sufficient support to an intruder who climbs directly on the insulator to scale the security fence.

While this situation may be solved by manufacturing a less rugged insulator, there are situations when it is desirable to be able to scale security fences when they are not operable (ie: say in a school). A less rugged insulator could not be used in this situation.

It is an object of the present invention to address the foregoing problems or at least to provide the public with a useful choice.

Further aspects and advantages of the present invention will become apparent from the ensuing description which is given by way of example only.

DISCLOSURE OF INVENTION

According to one aspect of the present invention there is provided a support device for supporting a length of material wherein the support device includes:

at least one support finger for supporting the length of material which applies an initial load to the support finger;

the support device characterised in that the support finger no longer supports the length of material when the support finger is placed directly or indirectly under a load substantially greater than the initial load.

According to another aspect of the present invention there is provided a support device for supporting a length of material having at least two fingers, the support device is capable of being placed in at least two orientations so that at least one finger is supporting the length of material which applies an initial load to the support finger;

the support device characterised in that the support device has:

a) at least one support finger incapable of supporting the length material when the support finger is placed directly or indirectly under an increased load substantially greater than the initial load when the support device is in one orientation; and b) at least one other support finger capable of supporting the length of material when the support finger is placed under an increased load substantially greater than the initial load when the support device is in another orientation.

For ease of reference the length of the material shall now be referred to as wire. However, this term should not be seen as limiting.

The support device shall now be referred to for ease of reference as an insulator. However, this should not be seen as limiting the scope of the present invention.

It is envisaged that the insulator may come in a variety of different shapes and forms.

In some preferred embodiments the insulator may include a main body and an attachment device for securing an insulator to an external support such as a fence post. However, these features are not necessarily essential.

Reference shall now be made to the external support as being a fence post—although this is just one example.

The main body and the attachment device may come in a multitude of varying shapes, sizes and forms.

In other embodiments the insulator may just include a main body, without inclusion of an attachment device. In these embodiments the attachment to a fence post can be external to the insulator itself. For example, the means of attachment may include gluing, fusing, or frictional engagement of the main body to the fence post.

It is envisaged that the support fingers may come in a variety of shapes, sizes and configurations provided it is capable of supporting wire.

In preferred embodiments the support finger may be substantially hook shaped.

There may also be a variety of ways in which the support fingers can be attached to the insulator. For instance, this attachment may be achieved by a variety of means including but not limited to, VELCRO™, adhesives and hinges to name but a few.

In other embodiments the support fingers may be integrally formed as part of the insulator.

For the purposes of this specification and for ease of reference the term load shall be defined as meaning a substantially downward force.

The initial load refers to the force experienced by the support finger when the wires of the fence are in their normal tensioned and substantially horizontal position.

It is envisaged that there may be many ways of adapting at least one support finger so that it no longer supports the wire once it carries an increased load substantially over the initial load.

The predetermined increased load is expected to be of the magnitude effected by a person or animal climbing directly on the insulator or on the wire supported by the supporting finger of the insulator.

In some embodiments the support finger may be made of a resilient material which deforms so as to no longer support the wire when it carries an increased load.

In other embodiments the support finger may be hingedly attached by a resilient hinge which is biased towards a support position for the support finger. However, when the support finger is placed under an increased load the hinge is no longer able to bias the support finger towards the support position with the effect that the support finger is now unable to support the wire.

Further embodiments may also include a support finger which is hingedly attached. In these embodiments there may a replaceable yet breakable link which holds the support finger in a position where it can support the wire. However, once the support finger is required to support an increased load the breakable link is broken and the support finger is free to open.

In preferred embodiments the support finger which is adapted to be unable to support the wire when it is placed under an increased load may be made of a weak construction.

Therefore, when the finger becomes placed under an increased load, the support finger breaks off due to its weak construction so that there is no longer any support provided for the wire by this support finger.

This weak construction may result from the support finger being made of less material, having less strengthening ribs and so forth than is used for conventional support fingers. For example only, the support finger may have a portion of it cut away.

In preferred embodiments, the insulator in addition to having a finger adapted to no longer support the wire when it carries an increased load, it also has at least one other support finger which is not so adapted. This non-adapted support finger allows the insulator to have two functionally different orientations for supporting the wire. In one orientation the adapted support finger can support the wire until the condition of an increased load is fulfilled. Whereas in the other configuration the non-adapted support finger can continue to support the wire even when the load is increased.

In an alternate aspect of the present invention there is provided an insulator characterised in that the attachment of the insulator to a fence post is not sufficiently strong to allow the support finger to support the wire when it carries a load substantially greater than the initial load.

The external means of attachment of an insulator to a fence post such as those already mentioned above may be inherently unable to support a load substantially greater than the increased load. For example if the means of attaching the insulator to the fence post is glue, this glue may have bonding characteristics which do not allow it to attach the insulator to the post when the insulator is supporting an increased load.

It should also be appreciated that the means of attachment may be modified so that their attachment characteristics are weakened or alternately the attachment of the insulator to a post is only partially achieved. For example, partially cutting a screw used for attachment or only using one screw when for ideal attachment two screws should be used.

Other ways of achieving the above attachment characteristics are of course envisaged.

In some other preferred embodiments the insulator may include a flashguard.

The flashguard is generally an additional surface which prevents the wire from coming in contact with the fence post.

However, a problem with flashguards is that rainwater can bridge the flashguard to the fence post leading to a short circuit (earthed) condition.

To further help reduce this bridging from occurring a spacer may be used to distance the flashguard from the fence post.

In preferred embodiments the spacer may be at least 8 mm in length. The spacer may also have an optional attachment device for attaching the insulator to an external support.

To help reduce bridging from occurring the flashguard may in preferred embodiments be curved away from the wire being supported by the insulator.

This curvature of the surface of the flashguard away from the wire reduces the ability of rainwater to bridge across the wire to the flashguard over any significant length further reducing bridging from occurring.

According to another aspect of the present invention there is provided a method of manufacturing a support device substantially as described above which includes at least two support fingers for supporting a length of material characterised by the step of adapting at least one support finger so that it is incapable of supporting a similar load to the other support finger.

According to another aspect of the present invention there is provided a method of creating an alarm system in a security fence which includes:

support devices as claimed in either claim 1 or 2 wherein the support devices are insulators; and at least one electrically conducting length of material; and at least one alarm which is set to be triggered when it detects a short circuit condition;

the method is characterised by the steps of:
  a) using the support devices to support one or more electrically conducting lengths of material so as to create a fence; and
  b) supplying an electrical current to the supported lengths of material in the fence; and
  c) attaching the alarm to the electrical circuit or circuits of the fence;

wherein when a person or animal tries to climb the fence at least one support device is unable to support the length of material so that a short circuit condition is created thereby setting off the alarm.

In preferred embodiments the electrically conducting length of material is wire. For ease of reference the electrically conducting length of material will now be referred to as being wire, however this should not be seen as limiting.

The short circuit condition may be created in a number of ways. In some instances it may be by the unsupported wire coming into contact with other wires in the fence. While in other instances it may be the supported wire coming into contact with the fence post.

The present invention may have a number of advantages over the prior art.

In the present invention at least one of support fingers has been adapted so that it no longer supports a wire when it carries an increased load (in preferred embodiments this occurs when only if the insulator has the appropriate orientation).

Thus, in the present invention when a person attempts to climb a security fence the adapted finger support is unable to support the wire along with the person's weight. Therefore, once the wire is no longer supported by the insulator it is able to come into contact with the other wires in the fence to create a short circuit condition. Alternatively it may come in contact with the fence post to also create a short circuit (earthed condition). This short circuit condition in turn triggers an alarm warning that someone has attempted to breach (and may have breached) the area encircled by the security fence.

Another advantage of the present invention is that when the insulator is placed in its second orientation the support fingers which actually support the wire, have not been adapted so that they are incapable of supporting the wire when it is placed under an increased load. Hence in any circumstances, for example, in schools during the day where it is desirable to have an electric fence which also allows people to climb the fence (ie. when the fence is not charged) they are able to do so.

A major advantage of the present invention is that a similar configured insulator to those in the prior art may be used with just a minor adaptations to weaken a support finger. Not only does this mean less tooling costs but also provides the manufacturer with market acceptance as the insulator is of a similar design (although functionally different) to a product the consumer is already familiar with.

BRIEF DESCRIPTION OF DRAWINGS

Further aspects of the present invention will become apparent from the following description which is given by way of example only and with reference to the accompanying drawings in which.

BEST MODES FOR CARRYING OUT THE INVENTION

With respect to the drawings, there is provided an insulator indicated by arrow 1.

Figure 2:
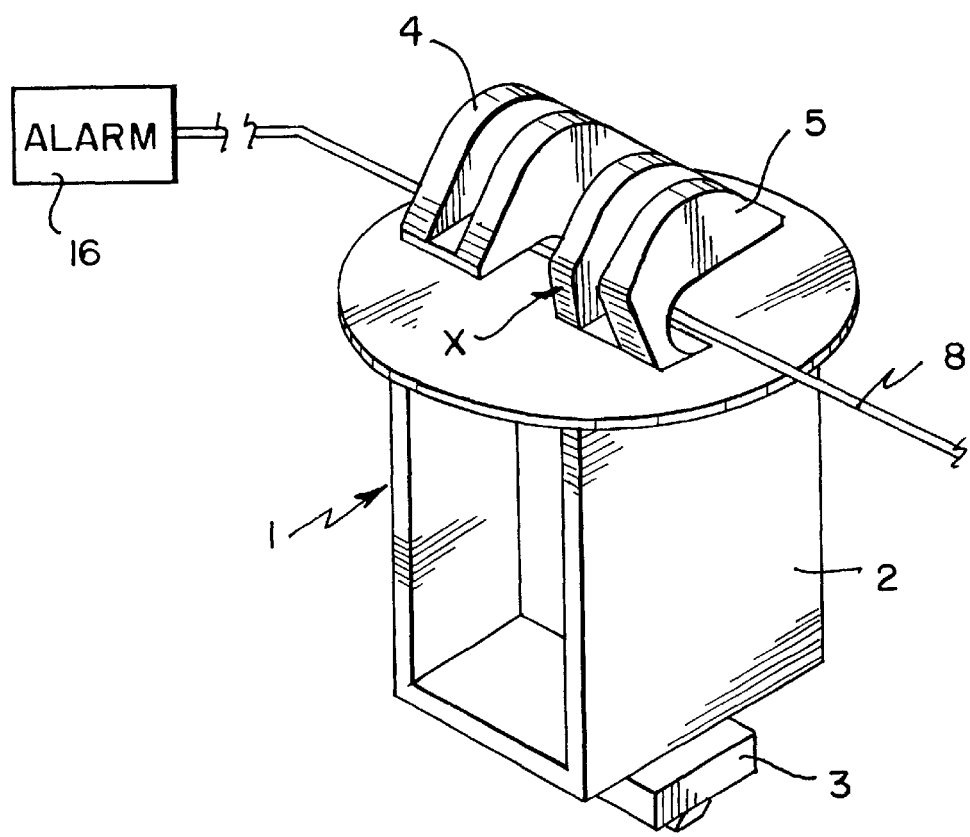
FIG. 2 illustrates a perspective view of the insulator.

The insulator comprises a main body 2, an attachment device 3 and support fingers 4,5 which create an aperture 6 capable of containing a wire 8 (shown in FIG. 2).

The insulator 1 is attached to a external support means (not shown) by the attachment device 3. The attachment means 3 allows the insulator to be clipped onto the external support.

Figure 3:
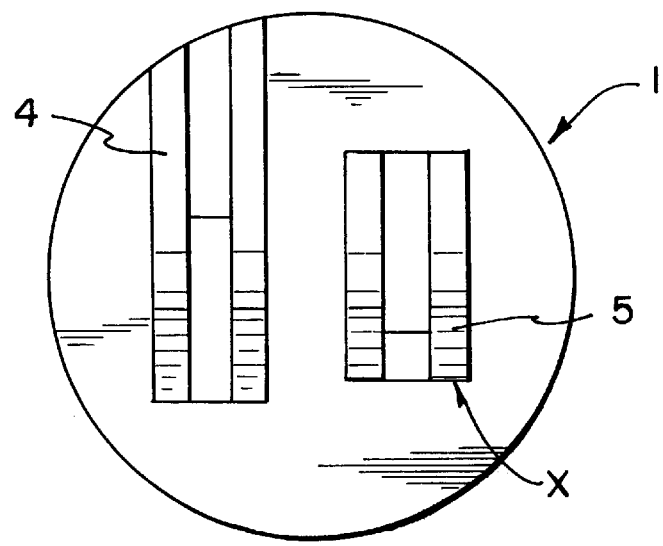
FIG. 3 shows a top view of the insulator

The insulator 1 is able to create an effective security fence as one of the support fingers 5 of the insulator 1 is adapted so that it cannot support the wire 8 when it is placed under an increased load. In the embodiment depicted support finger 5 has a weaker construction than that of support finger 4 as shown by arrow x. In the embodiments shown the weaker construction x of support finger may be achieved by cutting away or reducing the size of the finger 5 (see also FIGS. 2 and 3 where this is shown clearly).

Figure 1:
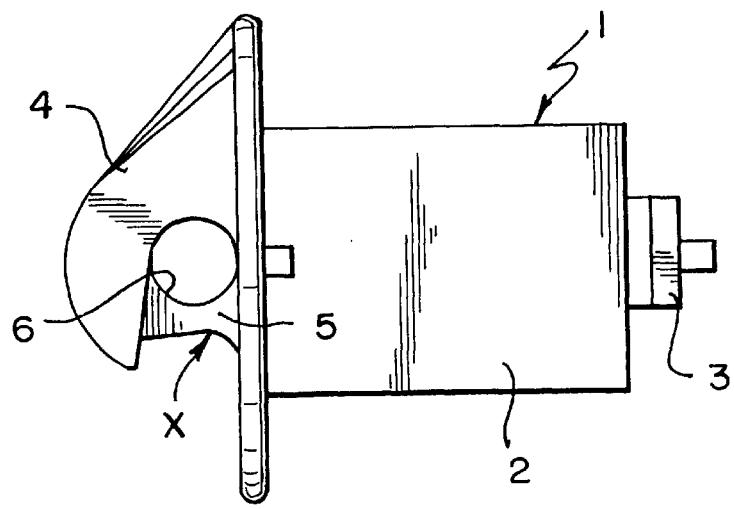
FIG. 1 shows a side elevation of the insulator.

Thus in a security fence when the insulator 1 has an orientation as shown in FIG. 1 (ie. with support finger 5 being nearer to the ground than support finger 4) support finger 5 is the finger which actually supports the wire 8 from the ground.

Therefore, when a person attempts to climb the fence the increased load placed on the support finger 5 causes support finger 5 to break off. As a result the wire 8 is released so that it may come into contact with the other wires (not shown) in the fence to create a short circuit condition.

In other embodiments the attachment of the insulator to the fence post is such that it breaks under an intruder's weight.

The short circuit condition in turn triggers an alarm 16 which indicates there has been a breach or attempted breach of the security fence.

If the insulator 1 is placed in the second orientation (ie. the reverse of that shown in FIG. 1) support finger 4 (which has not been so adapted) would support the wire 8 so that the insulator 1 may now support the wire 8 when it carries an increased load.

Figure 4:
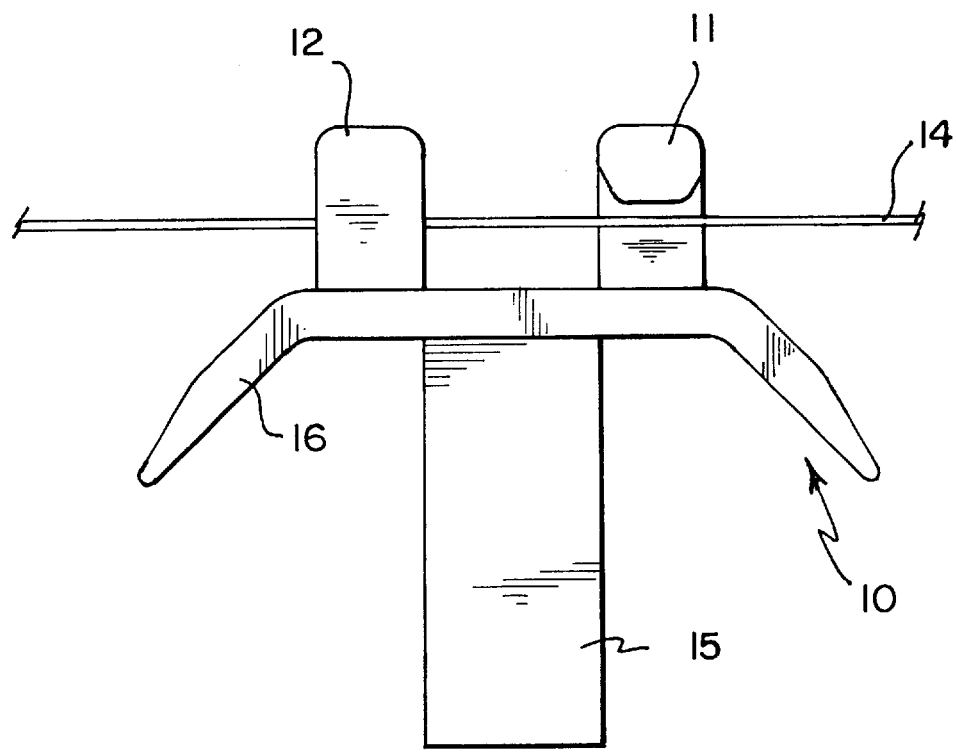
FIG. 4 shows a top view of a further embodiment of the insulator.

FIG. 4 shows an insulator 10 which includes support fingers 11 and 12 for supporting a wire 14.

The insulator 10 also includes a spacer 15 and a curved flashguard 16 which reduces the risk of rainwater bridging the flashguard to the fence post (not shown) to cause a short circuit (earthed) condition.

Aspects of the present invention have been described by way of example only and it should be appreciated that modifications and additions may be made thereto without departing from the scope of the appended claims.

The claims defining the invention are:

1. A support device for supporting a length of material having at least two fingers, the support device capable of being placed in at least two orientations so that at least one finger is supporting the length of material which applies an initial load to the support finger;

the support device characterized in that the support device has:

a) at least one support finger designed to be structurally incapable of supporting the length of material when the support finger is placed under a predetermined increased load which is greater than the initial load when the support device is in one orientation; and b) at least one other support finger designed to be structurally capable of supporting the length of material when the support finger is placed under the predetermined increased load which is greater than the initial load when the support device is in another orientation;

wherein dependent on the orientation of the support device, the support device is either capable or incapable of supporting the length of material when the support finger is placed under an increased load.

2. A support device as claimed in claim 1 wherein the support device is an insulator.

3. A support device as claimed in claim 2 where at least one support finger is adapted so as to be able not to support a load substantially greater than the initial load.

4. A support device as claimed in claim 3 wherein the device includes an inwardly curved flashguard.

5. A support device as claimed in claim 3 wherein the device includes a spacer.

6. A method of manufacturing a support device, said support device having at least two fingers, the support device capable of being placed in at least two orientations so that at least one finger is supporting the length of material which applies an initial load to the support finger;
   wherein said method comprises the steps of:
      forming at least one support finger so that it is incapable of supporting the length of material when the support finger is placed under a predetermined increased load which is greater than the initial load when the support device is in one orientation; and
      forming at least one other support finger so that it is capable of supporting the length of material when the support finger is placed under said predetermined increased load which is greater than the initial load when the support device is in another orientation.

7. A method of creating an alarm system in a security fence, said security device comprising:
   an insulating support device having at least two fingers, the support device capable of being placed in at least two orientations so that at least one finger is supporting the length of material which applies an initial load to the support finger, at least one support finger being incapable of supporting the length of material when the support finger is placed under a predetermined increased load which is greater than the initial load when the support device is in one orientation; and
   at least one other support finger being capable of supporting the length of material when the support finger is placed under the predetermined increased load which is greater than the initial load when the support device is in another orientation;
   at least one electrically conducting length of material; and
   at least one alarm which is set to be triggered upon detection of a short circuit condition;
   the method comprising the steps of:
      a) supporting the at least one electrically conducting length of material with the insulating support device, thereby creating a fence; and
      b) supplying an electrical current to at least one supported length of material, thereby forming an electrical circuit; and
      c) attaching the alarm to the electrical circuit;
   wherein, when a person or animal tries to climb the fence at least one of the fingers is unable to support the length of material so that a short circuit condition is created, thereby setting off the alarm.

* * * * *

UNITED STATES PATENT AND TRADEMARK OFFICE
CERTIFICATE OF CORRECTION

| | | |
|---|---|---|
| PATENT NO. | : 6,290,190 B1 | Page 1 of 1 |
| DATED | : September 18, 2001 | |
| INVENTOR(S) | : Gregory David Kendall | |

It is certified that error appears in the above-identified patent and that said Letters Patent is hereby corrected as shown below:

<u>Title page,</u>
Item [30], Foreign Application Priority Data, add:
-- New Zealand Patent No. 280761 filed on December 21, 1996 --.

Signed and Sealed this

Twenty-fifth Day of February, 2003

JAMES E. ROGAN
*Director of the United States Patent and Trademark Office*